(12) United States Patent
Herrius de Roest

(10) Patent No.: US 8,720,161 B2
(45) Date of Patent: May 13, 2014

(54) MAST FOR A WIND TURBINE

(75) Inventor: Anton Herrius de Roest, Enschede (NL)

(73) Assignee: Postensa Wind Structures S.A. de C.V., Mexico City (MX)

( * ) Notice: Subject to any disclaimer, the term of this patent is extended or adjusted under 35 U.S.C. 154(b) by 428 days.

(21) Appl. No.: 12/522,294

(22) PCT Filed: Mar. 7, 2008

(86) PCT No.: PCT/EP2008/001848
§ 371 (c)(1),
(2), (4) Date: Jul. 7, 2009

(87) PCT Pub. No.: WO2008/110309
PCT Pub. Date: Sep. 18, 2008

(65) Prior Publication Data
US 2010/0071301 A1    Mar. 25, 2010

(30) Foreign Application Priority Data
Mar. 15, 2007    (DE) .................... 20 2007 003 842 U

(51) Int. Cl.
*E04C 5/08*    (2006.01)
*E04H 12/00*    (2006.01)
*E04C 3/00*    (2006.01)
*E04G 21/00*    (2006.01)

(52) U.S. Cl.
USPC ........... 52/848; 52/223.5; 52/843; 52/651.07; 52/745.18

(58) Field of Classification Search
USPC ........... 52/169.13, 223.4, 223.5, 249, 651.01, 52/651.07, 649.2, 843, 845, 848, 745.17, 52/745.18
See application file for complete search history.

(56) References Cited

U.S. PATENT DOCUMENTS

| | | | |
|---|---|---|---|
| 666,146 A | 1/1901 | Lanz | 52/843 |
| 3,687,412 A * | 8/1972 | Vaughan et al. | 249/158 |
| 4,248,025 A * | 2/1981 | Kleine et al. | 52/845 |
| 5,375,353 A * | 12/1994 | Hulse | 40/217 |
| 5,501,046 A | 3/1996 | Hattingh et al. | 52/266 |
| 6,094,881 A * | 8/2000 | Lockwood | 52/845 |
| 6,532,700 B1 * | 3/2003 | Maliszewski et al. | 52/40 |
| 7,269,926 B1 | 9/2007 | Rakosi | 52/81.1 |

(Continued)

FOREIGN PATENT DOCUMENTS

| | | | |
|---|---|---|---|
| CH | 547405 | 3/1974 | E04B 1/343 |
| EP | 0960986 | 12/1999 | E04B 1/34 |

(Continued)

OTHER PUBLICATIONS

WO 2006/11597 A1 to Montaner Fraguet.*

(Continued)

*Primary Examiner* — Ryan Kwiecinski
(74) *Attorney, Agent, or Firm* — Sunstein Kann Murphy & Timbers LLP

(57) ABSTRACT

The invention relates to a mast (10) for a wind turbine, which mast tapers towards the top and comprises at least two superposed annular mast sections (12, 14, 16, 18, 20). Every annular mast section consists of a plurality of prefabricated wall parts (A, B, C, D, E, F), wherein at least a part of which has a curved section, at least the curved sections of prefabricated wall parts in different annular mast sections having at least identical cross-section.

21 Claims, 6 Drawing Sheets

(56) References Cited

U.S. PATENT DOCUMENTS

Figure 1:
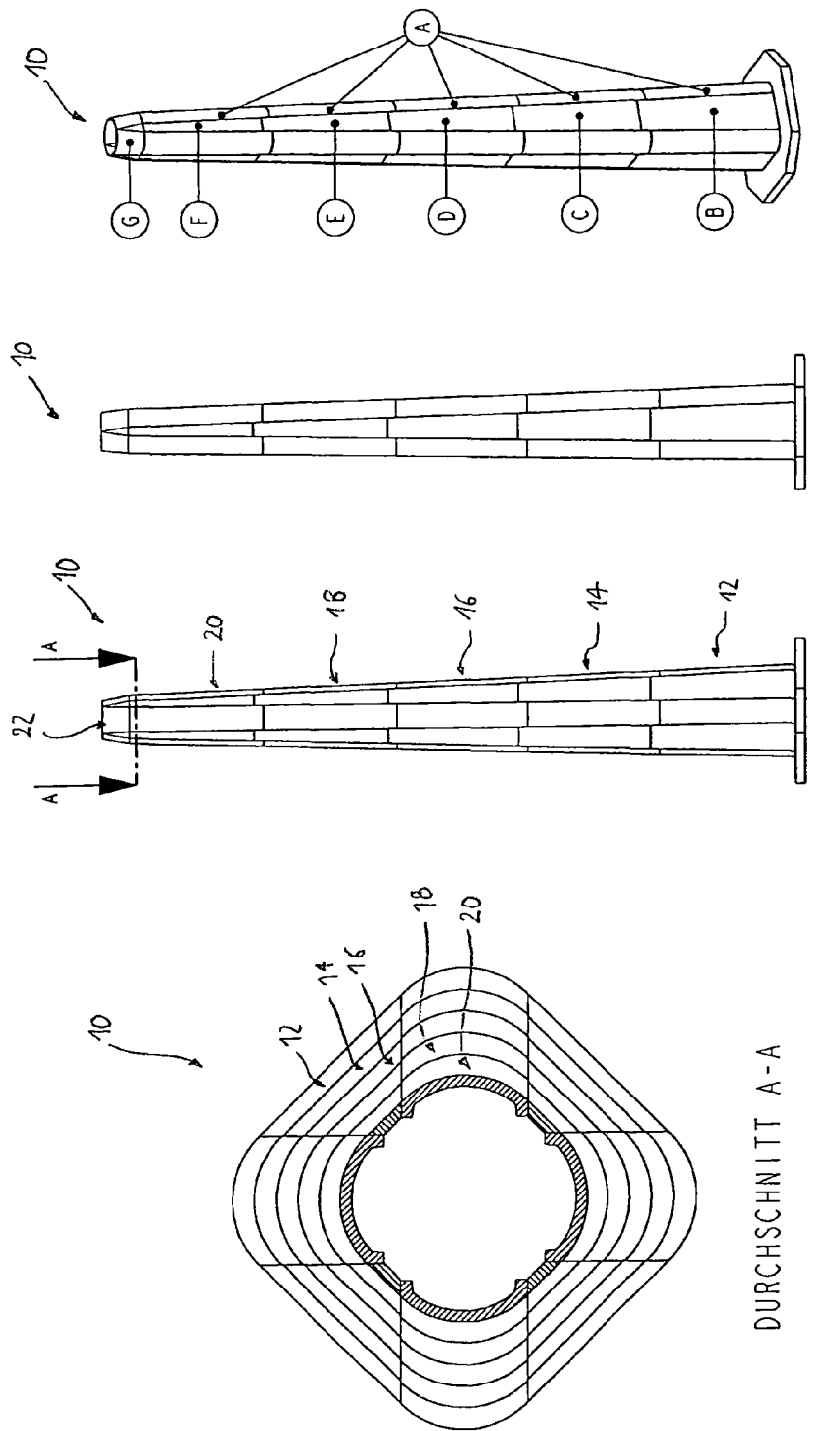

| | | | |
|---|---|---|---|
| 7,739,843 B2* | 6/2010 | Cortina-Cordero | 52/223.5 |
| 7,765,766 B2* | 8/2010 | Gomez et al. | 52/745.04 |
| 7,770,343 B2* | 8/2010 | Montaner Fraguet et al. | 52/223.5 |
| 2005/0129504 A1* | 6/2005 | De Roest | 415/4.2 |
| 2005/0160697 A1* | 7/2005 | Oliphant et al. | 52/731.4 |
| 2005/0166521 A1* | 8/2005 | Silber | 52/633 |
| 2006/0156681 A1* | 7/2006 | Fernandez Gomez et al. | 52/721.1 |
| 2006/0213145 A1* | 9/2006 | Haller | 52/651.01 |
| 2006/0272244 A1* | 12/2006 | Jensen | 52/223.5 |
| 2007/0294955 A1* | 12/2007 | Sportel | 52/40 |
| 2008/0209842 A1* | 9/2008 | Montaner Fraguet et al. | 52/651.07 |
| 2010/0139181 A1* | 6/2010 | Cortina-Cordero et al. | 52/125.2 |
| 2010/0162637 A1 | 7/2010 | Brell-Cokcan | 52/80.1 |

FOREIGN PATENT DOCUMENTS

| | | | |
|---|---|---|---|
| EP | 1561883 | 8/2005 | E04H 12/08 |
| FR | 1295463 | 5/1962 | |
| JP | 64-071973 | 3/1989 | E04H 12/08 |
| JP | 2005030066 | 2/2005 | B28B 21/70 |
| NL | 8700278 | 9/1988 | E02D 21/00 |

OTHER PUBLICATIONS

International Searching Authority—EPO, International Search Report, PCT/EP2008/001848; dated Feb. 2, 2009.

* cited by examiner

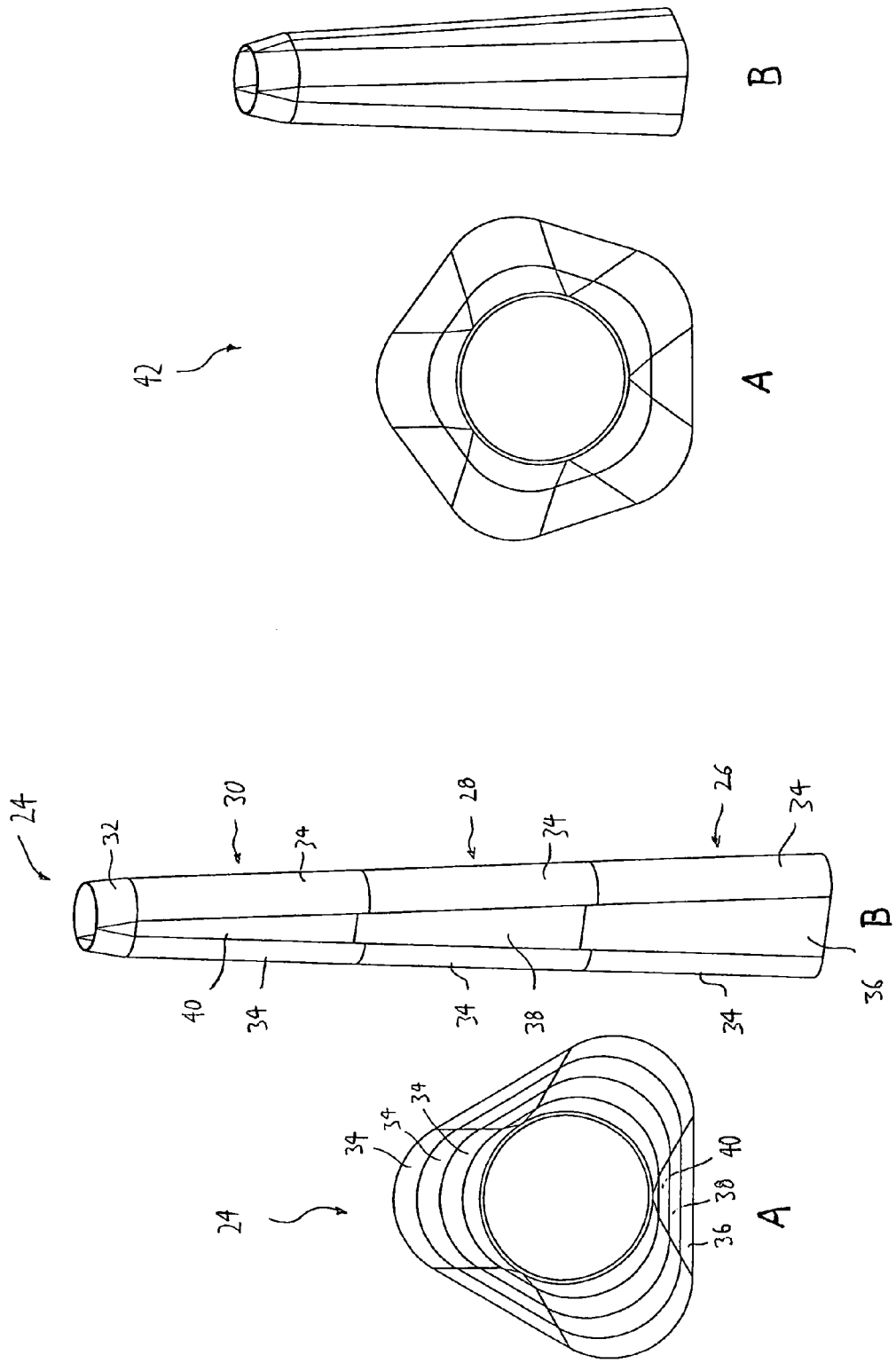

MAST FOR A WIND TURBINE

The present invention relates to a mast for a wind turbine according to the preamble of claim 1 and a method for manufacturing a mast according to the preamble of claim 13. The mast tapers towards the top and comprises at least two annular mast sections arranged on top of each other, wherein each of the annular mast sections consists of a plurality of prefabricated parts, at least some of which have a curved section.

Examples for masts of the type mentioned above are known, for example, from EP 1 474 579 B1. The prefabricatable wall parts, for example, can consist of concrete, composite materials, steel, or other materials with high strength.

By means of prefabricating the parts, the parts can be manufactured more efficiently in an environment specifically set up for this purpose and, in general, a better quality can be ensured. For this, the size of the prefabricatable wall parts can be selected in such a manner that their dimensions and their weight allow a normal transportation, for which it is not required to get a special permit and for which a special escort is not necessary. By using prefabricated parts, hence a high quality at relatively low cost can be achieved.

The present invention is based on the object to reduce the manufacturing cost for a mast of the type mentioned above.

This object is solved for a mast according to the invention in that at least the curved sections of prefabricatable wall parts in different annular mast sections are identical at least with respect to their cross-sections. Furthermore, the object is solved by means of a method according to claim 13. Advantageous developments are identified in the dependent claims.

It is clear that at least some of the wall parts must be curved to be able to form annular mast sections. In addition, the mast is intended to be tapered towards the top so that in different annular mast sections at least partially different wall parts must be used. The obvious manner to achieve this is to use, with increasing height, wall parts with an increasing curvature in the different annular mast sections so that the diameter of the annular mast sections can decrease with increasing height.

However, exactly the curved wall parts are complicated to manufacture. When, for example, the wall parts must be manufactured by means of concrete casting, a completely closed and hence expensive mold is required. Since in the prior art the curved sections are different in different annular mast sections, at least one such completely closed and expensive mold is required for each annular mast section, which increases the costs.

When, however, the parts are made of steel, steel parts for different annular mast sections with different radii must be bent, which increases the costs as well.

With the solution according to the invention, at least the curved sections of prefabricatable wall parts in different annular sections are identical at least with respect to their cross sections. For example, in one embodiment of the invention, all curved wall parts in the whole tower or mast, respectively, can be identical. If the wall parts consist of concrete, only one completely closed mold would be required. The tapering of the mast towards the top could then be achieved by a suitable selection of flat or plane wall parts which differ in different annular wall sections as explained in more detail below with reference to an exemplary embodiment. This represents overall a high efficiency gain, since the molds for plane wall parts are structured much simpler, and a plurality of molds for plane wall parts thus increase the manufacturing cost only insignificantly. Moreover, plane molds, in addition, can be designed variably so that with a variable mold, wall parts of different sizes can be manufactured.

However, the invention is not limited to such an exemplary embodiment, but a considerable efficiency increase can be achieved already when the wall parts of different mast sections are identical at least with respect to their curved sections only, but may possibly have plane sections which differ from one another. It is possible to produce a mold which comprises an unvarying closed section for forming the curved section and a variable section for forming plane wall part sections of different shape and size. Also in such a case, for the whole mast, only one single mold would be required for manufacturing the curved wall parts so that the manufacturing costs can be reduced considerably.

Finally, it may be sufficient that the curved sections of wall parts of different mast sections have identical cross-sections. Namely, the manufacturing is only insignificantly more complicated when the wall parts in different annular mast sections, with identical cross-section, have a different length in longitudinal direction of the mast.

In this respect, the aforementioned efficiency increase is already achieved when at least the curved sections of prefabricated wall parts in different annular mast sections have at least identical cross-sections.

In a preferred embodiment, the curved sections of the prefabricatable wall parts have an arc-shaped cross-section. The term "arc-shaped" is not limited to an arrangement with a constant radius of curvature but serves for differentiation with respect to wall parts with an angular structure.

Preferably, the annular mast sections have a cross-section with the shape of a polygon with arc-shaped corners. For this, the polygon has preferably between 3 and 6 arc-shaped corners.

In a preferred embodiment, each of the annular mast sections consists of alternately arranged curved wall parts and plane wall parts, wherein the curved wall parts in different annular wall sections are identical. For this, at least some of the plane wall parts are preferably substantially trapezoidal, and the trapezoidal plane wall parts are preferably identical within each annular mast section. For this, the trapezoidal plane wall parts are preferably dimensioned in such a manner that abutting edges of trapezoidal wall parts of two adjacent annular mast sections have the same length.

In this embodiment, thus, the curved wall parts are identical in different annular mast sections and can be manufactured by means of the same mold, although the mast tapers in different annular mast sections with increasing height. The tapering of the mast is achieved by means of the shape of the plane wall parts which hence are generally not identical in different annular wall sections. However, as mentioned above, the need for plane wall parts of different shapes does not result in a significant increase of the manufacturing costs.

Preferably, the joints between abutting plane wall parts of two adjacent annular mast sections are offset in longitudinal direction of the mast with respect to the joints between abutting curved wall parts of the adjacent annular mast sections. Thereby an interlocking is achieved by means of which the stability of the mast, for example, against strong wind pressure, is increased.

In a particularly advantageous embodiment, the plane wall parts in the bottom mast section of the mast are either shorter or longer in longitudinal direction of the mast than the curved wall parts, the plane wall parts in the top mast section are correspondingly longer or shorter, respectively, than the curved wall parts, and the plane wall parts in the intermediate annular mast sections have the same length as the curved wall parts. In this manner, the above mentioned interlocking can be easily achieved without the manufacturing process becoming notably more complicated.

In an alternative advantageous development of the invention, at least some of the wall parts have a curved section and a substantially trapezoidal plane section. For these wall parts, the trapezoidal sections can then be varied, depending on the annular mast segment in which they are intended to be used, so as to result in a tapering of the mast, while the curved section remains unchanged, as mentioned above. This embodiment is an example for an arrangement in which, in case of a concrete design, one single mold can be used which is variable with respect to the plane sections, or, in case of a steel design, an identical bending device can be used for the steel wall parts.

Figure 6:
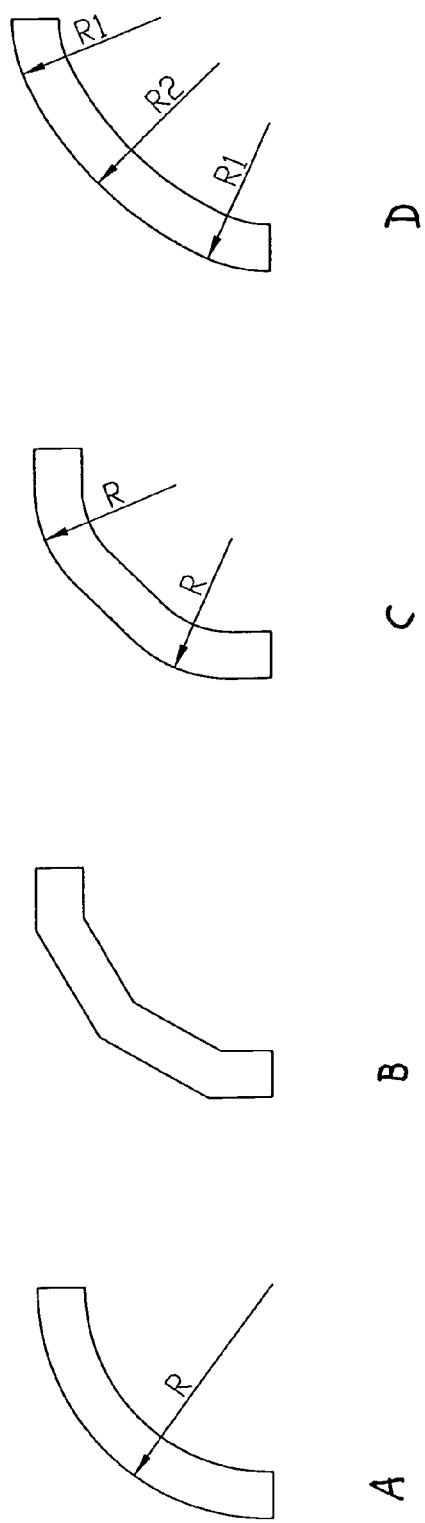
Figure 7:
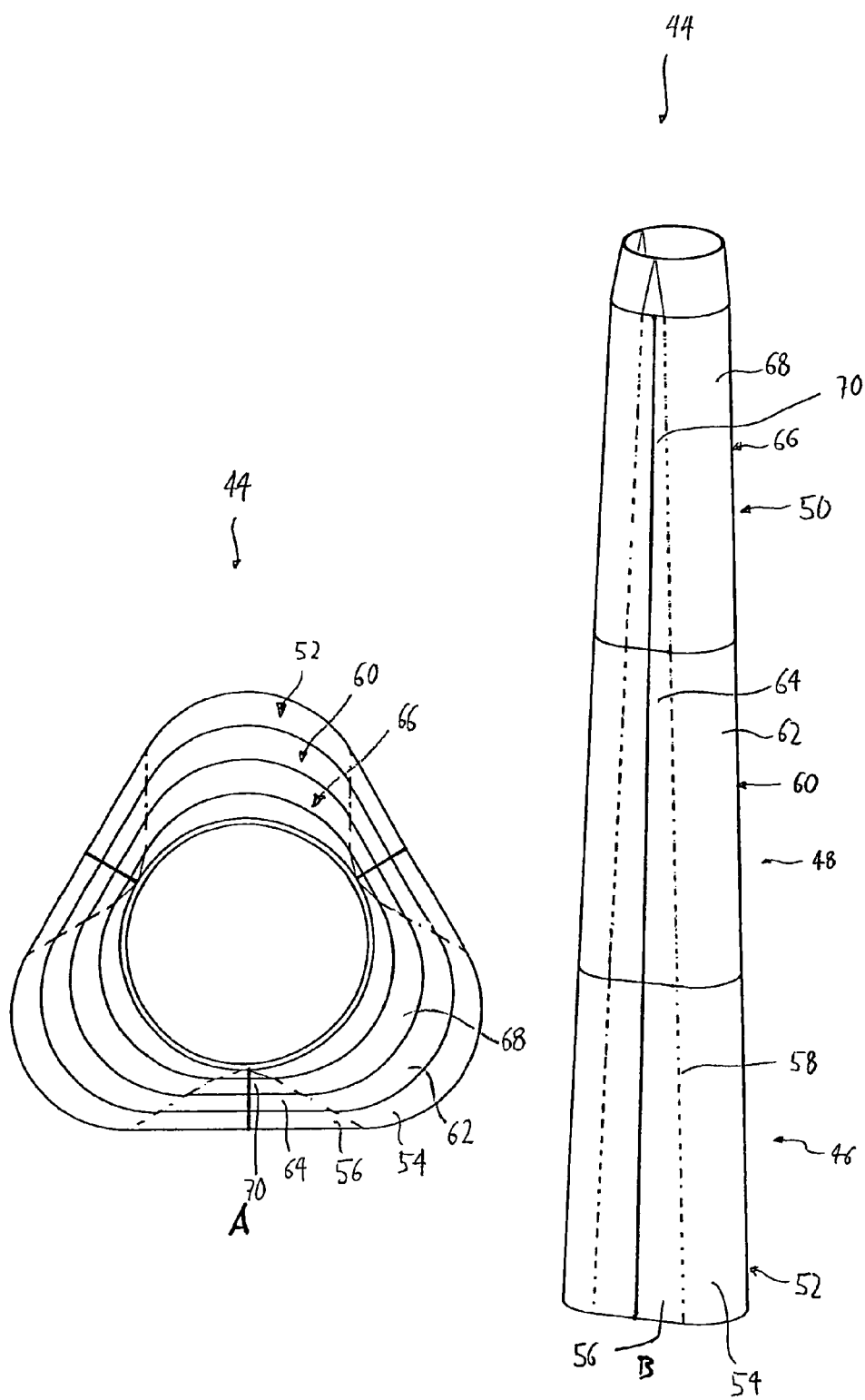

Further advantages and features of the present invention arise from the following description in which the principles of the invention are illustrated by means of exemplary embodiments with reference to the attached drawings, in which:

FIG. 1A shows a cross-section of the mast according to a first embodiment of the invention along the line A-A of FIG. 1B, FIG. 1B shows a longitudinal sectional view of the mast of the first embodiment, FIG. 1C shows a side view of the mast of the first embodiment, FIG. 1D shows a perspective view of the mast of the first embodiment, FIGS. 2A and 2B show perspective views of the curved wall part of the mast of the first embodiment, FIGS. 3A to 3E show a perspective view of the plane wall parts of the mast of the first embodiment, FIGS. 4A and 4B show a top view and a perspective view, respectively, of a mast according to a second embodiment of the invention, FIGS. 5A and 5B show a top view and a perspective view, respectively, of a mast according to a third embodiment of the invention, FIG. 6A to 6D show examples for cross-sections of curved wall parts, and FIGS. 7A and 7B show a top view and a perspective view, respectively, of a mast according to a fourth embodiment of the present invention.

Figure 2:
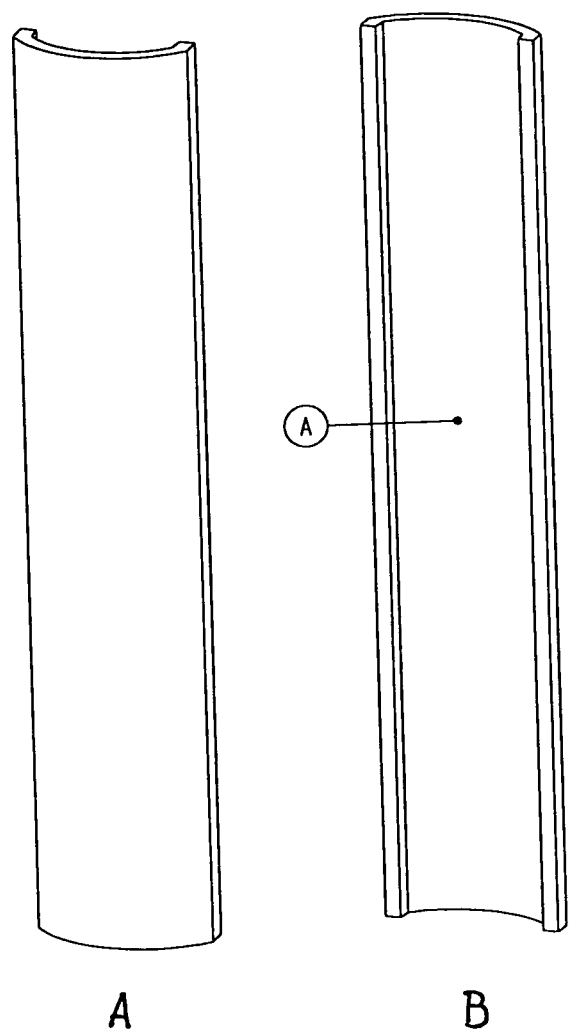

In FIG. 1, a first embodiment of a mast 10 for a wind turbine according to an embodiment of the invention is shown. In particular, FIG. 1A shows a cross-section of the mast 10 along the line A-A of FIG. 1B, FIG. 1B shows a longitudinal section of the mast 10, FIG. 1C shows a side view of the mast 10, and FIG. 1D shows a perspective view of the mast 10.

As is apparent from FIG. 1, the mast 10 consists of five annular mast sections 12, 14, 16, 18, and 20 arranged on top of each other. The diameters of the annular mast sections 12 to 20 decrease from the bottom to the top so that overall, the mast 10 tapers from the bottom to the top. On the top annular mast section 20, an adaptor 22 is arranged which is suitable for holding an adjacent steel pipe section or the nacelle of the wind turbine.

The annular mast sections 12 to 20 have the cross-section of a rectangle with rounded corners. Each of the annular mast sections 12 to 20 consists of four curved wall parts A and four plane wall parts B (in the bottom mast section 12), C (in mast section 14), D (in mast section 16), E (in mast section 18), and F (in the top mast section 20), respectively. The curved wall parts A are shown in a perspective view in FIG. 2, and the plane wall parts B to F are shown in perspective views in FIGS. 3A to 3E.

It should be noted that the curved wall parts A are identical in all annular mast sections 12 to 20. When, for example, the wall parts A to F are made of concrete, thus only one single closed mold is required to manufacture the curved wall parts A.

The plane wall parts B to F are identical within the same annular mast section 12 to 20; however, their width decreases with increasing height of the associated annular mast section, whereby the overall tapered shape of the mast 10 is achieved.

As is shown in particular in FIGS. 3A to 3E, the plane wall parts B to F are trapezoidal, and the short side of the trapezoid has always the same length as the long side of the trapezoid of the plane wall part in the next higher annular mast section.

Figure 3E:
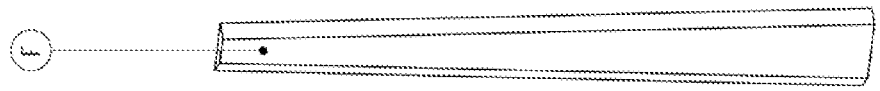
Figure 3D:
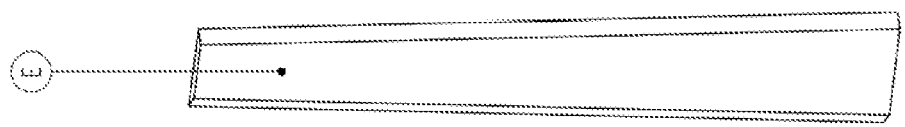
Figure 3C:
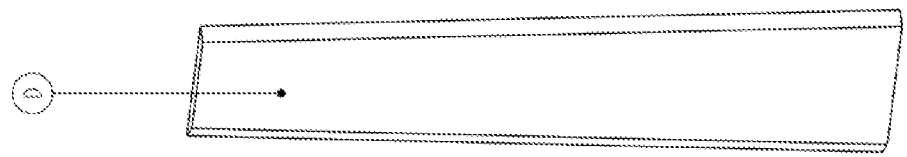
Figure 3B:
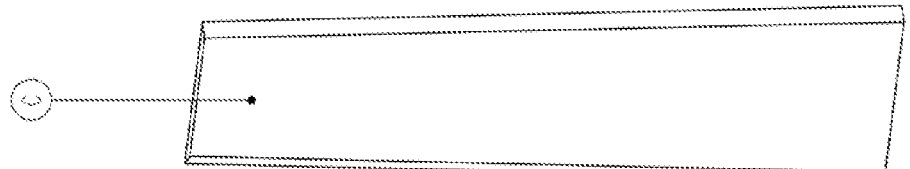
Figure 3A:
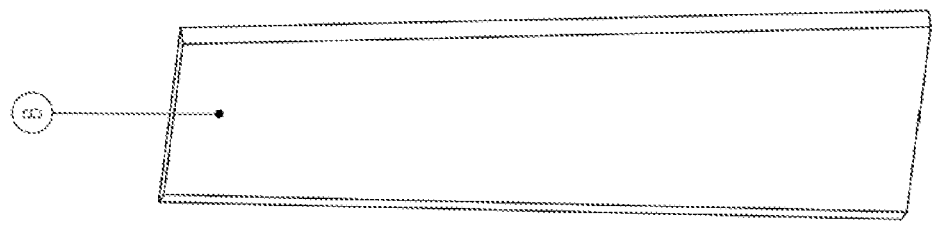

As is further shown in FIGS. 3B to 3D, the plane wall parts C, D, E of the middle annular wall sections 14, 16, or 18, respectively, have the same length viewed in longitudinal direction of the mast 10, and their length corresponds to the length of the curved wall parts A. The plane wall parts B of the bottom annular mast section 12 are slightly longer and the plane wall sections F of the top annular mast section 20 are correspondingly slightly shorter than the remaining wall parts A, C, D, and E. As is apparent from FIGS. 1B to 1D, this results in that the joints between abutting plane wall parts of two adjacent annular mast sections are offset in longitudinal direction of the mast 10 with respect to the joints between abutting curved wall parts of the adjacent annular mast sections. This results in an interlocked joint which increases the stability of the mast 10.

Possibilities for connecting wall parts A to F are known, for example, from EP 1 474 579 B1 and hence are not described here.

In FIG. 4A, a top view and in FIG. 4B, a perspective view of a second embodiment 24 of a mast for a wind turbine are shown. The mast 24 consists of annular mast sections 26, 28, and 30, and an adaptor 32 which is adjacent to the top annular mast section 30. The structure of the mast 24 is similar to the one of FIG. 1 except that the annular mast sections 26, 28, and 30 have a cross-section in the shape of a triangle with rounded or arc-shaped corners, respectively. Each of the annular mast sections 26, 28, 30 is formed from three curved wall parts 34, which are identical for the whole mast 24, and from three plane wall sections 36, 38, 40, which are identical within each annular mast section but are different in different mast sections 26, 28, 30, similar as mast 10 of FIG. 1.

In FIGS. 5A and 5B, a mast 42 according to a third embodiment is shown in a top view or a perspective view, respectively. The structure is similar to the one of masts 10 and 24, except that the cross-sections of the annular mast sections (of which only one is shown in FIG. 5) have the shape of a pentagon with rounded corners. Apart from that, the structure of the mast 42 is similar to the one of the masts 10 and 24 so that a further description is omitted.

In FIGS. 6A to 6D, different cross-sectional shapes for curved wall parts are shown. The curved wall parts can have a uniform curve, i.e., a cross-section with the shape of a segment of a circle (FIG. 6A), or a curve which is variable in circumferential direction of the wall part, as shown in FIG. 6D. Further, the curved wall parts can have curved sections and straight sections, as shown in FIG. 6C. The wall part of FIG. 6C has two arc-shaped, curved sections, which are characterized by curve radii R, with intermediate plane sections. The wall part of FIG. 6B consists of straight sections with intermediate angles.

All wall parts of FIG. 6A to 6D are considered in the present description at least as approximately "arc-shaped", even the wall part of FIG. 6B, since by means of its three bending points, it comes close to an arc shape as such. A curved wall part with two bending points and intermediate plane sections would also be denoted as "arc-shaped". However, a wall part which is bent once and which has only two plane sections arranged at an angle would not be considered as arc-shaped.

In FIGS. 7A and 7B, a mast 44 is shown as a fourth embodiment in a top view and a perspective view, respectively.

It should be noted that the mast 44 of FIGS. 7A and 7B in its overall shape is identical to the mast 24 of FIGS. 4A and 4B and differs only by the shape of the wall parts. The mast 44 has three annular mast sections 46, 48, and 50. The bottom annular mast section 46 consists of three equal wall parts 52, each of them comprising a curved section 54 and two plane sections 56. A virtual border line between the curved section 54 and the plane sections 56 is indicated by a dashed line 58.

The middle annular mast section 48 consists in a similar manner of three equal wall parts 60, each of them having a curved section 62 and two adjacent plane sections 64. Finally, the top annular mast section 50 consists of three equal wall parts 66, each of them having a curved section 68 and two plane sections 70 adjacent thereto.

Through comparison with FIG. 4, it is apparent that the curved sections 54, 62, and 68 of the wall parts 52, 60, or 66, respectively, correspond to the curved wall parts 34 of FIG. 4. The plane sections 56, 64, and 70 of the wall parts 52, 60, or 66, respectively, are trapezoidal, and each of them correspond to one half of the trapezoidal wall parts 36, 38, and 40, respectively, of FIG. 4.

Since the wall parts 52, 60, and 66 each have identical curved sections 54, 62, or 68, respectively, they can be manufactured very efficiently. When, for example, the wall parts 52, 60, and 66 are steel parts, the bending process during their manufacturing is identical. When said wall parts are cast concrete parts, for all parts, one single base mold can be used which has to be modified between the casting processes only in such a manner that it results in plane wall sections 56, 64, 70 which are different in size. Such a modification can be easily and cost efficiently performed by one skilled in the art. It is much more difficult, if not impossible, to modify a mold in which the curved sections, for example the curve radii, can be varied. Instead, for manufacturing of wall parts with different curve radii, different molds would be provided which increases the manufacturing costs.

The features described herein can be of importance individually as well as in combination.

Although in the drawings and in the preceding description preferred exemplary embodiments are shown and described in detail, this should be understood as strictly exemplary and as non-restrictive to the invention. It is pointed out that only preferred exemplary embodiments are illustrated and described and that all changes and modifications, which are currently and in the future within the scope of the appended claims, are intended to be protected.

The invention claimed is:

1. A mast for a wind turbine, the mast having a longitudinal length that tapers towards a top and comprises at least two annular mast sections vertically arranged on top of each other, wherein each of said at least two annular mast sections tapers from a bottom to a top and includes a plurality of prefabricatable wall parts formed substantially of concrete, at least some of which have a curved section, characterized in that at least some of the curved sections of prefabricatable wall parts in different annular mast sections have cross-sections perpendicular to the longitudinal length of the same size and shape along their length from being formed in a single common base mold.

2. The mast according to claim 1, wherein the curved sections have an arc-shaped cross-section.

3. The mast according to claim 1, wherein the annular mast sections have a polygon shaped cross-section with arc-shaped corners.

4. The mast according to claim 3, wherein the polygon shaped cross-sections have between three and six arc-shaped corners.

5. The mast according to claim 1, wherein the annular mast sections include alternately arranged curved wall parts and plane wall parts wherein the curved wall parts in different annular mast sections are identical.

6. The mast according to claim 5, wherein at least some of the plane wall parts are substantially trapezoidal.

7. The mast according to claim 6, wherein the trapezoidal plane wall parts within each of the annular mast section are identical.

8. The mast according to claim 6, wherein the trapezoidal plane wall parts are dimensioned so that abutting edges of trapezoidal wall parts of two adjacent annular mast sections have the same length.

9. The mast according to claim 5, wherein two adjacent annular mast sections have abutting plane wall parts which meet along a common plane wall joint and abutting curved wall parts which meet along a common curved wall joint, wherein the plane wall joint is offset in a longitudinal direction from the curved wall joint.

10. The mast according to claim 5, wherein the plane wall parts in a bottom annular mast section of the mast are either shorter or longer in longitudinal direction than the curved wall parts, the plane wall parts in a top mast section are correspondingly longer or shorter, respectively, than the curved wall parts, and the plane wall parts in an intermediate annular mast sections are of the same length as the curved wall parts.

11. The mast according to claim 1, wherein at least some of the prefabricatable wall parts comprise a curved section and a substantially trapezoidal plane section.

12. A method for manufacturing a mast for a wind turbine, the mast having a longitudinal length that tapers towards a top and comprises at least two annular mast sections each tapering from a bottom to a top and vertically arranged on top of each other, the method comprising:
prefabricating a plurality of wall parts formed substantially from concrete for each of the at least two annular mast sections including molding with a single common base mold some wall parts for different annular mast sections having a curved section, wherein at least some of the prefabricated wall parts with curved sections of different annular mast sections have cross-sections perpendicular to the longitudinal length of the same size and shape along their length; and
assembling the annular mast sections from the prefabricated wall parts to form the mast.

13. A method according to claim 12, wherein the curved sections have an arc-shaped cross-section.

14. A method according to claim 12, wherein the annular mast sections have a polygon shaped cross-section with arc-shaped corners.

15. A method according to claim 14, wherein the polygon has between three and six arc-shaped corners.

16. A method according to claim 12, wherein each of the annular mast sections is constructed of alternately arranged curved wall parts and plane wall parts, wherein the curved wall parts in different annular mast sections are identical.

17. A method according to claim 16, wherein at least some of the plane wall parts are substantially trapezoidal.

18. A method according to claim 17, wherein the trapezoidal plane wall parts within each of the annular mast section are identical.

19. A method according to claim 12, wherein at least some of the wall parts are manufactured by using variable molds so that wall parts of different sizes can be manufactured with the same variable mold.

20. A method according to claim 19, wherein the wall parts that are manufactured with the same variable mold include planar-shape wall parts.

21. A method according to claim 19, wherein a variable mold with an unvarying section for forming a curved wall section and a variable section for forming a plane wall part section of different shape or size is used.

* * * * *

UNITED STATES PATENT AND TRADEMARK OFFICE
CERTIFICATE OF CORRECTION

PATENT NO. : 8,720,161 B2
APPLICATION NO. : 12/522294
DATED : May 13, 2014
INVENTOR(S) : Anton Herrius de Roest Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Twenty-ninth Day of September, 2015

Michelle K. Lee
*Director of the United States Patent and Trademark Office*